ABSTRACT OF THE DISCLOSURE

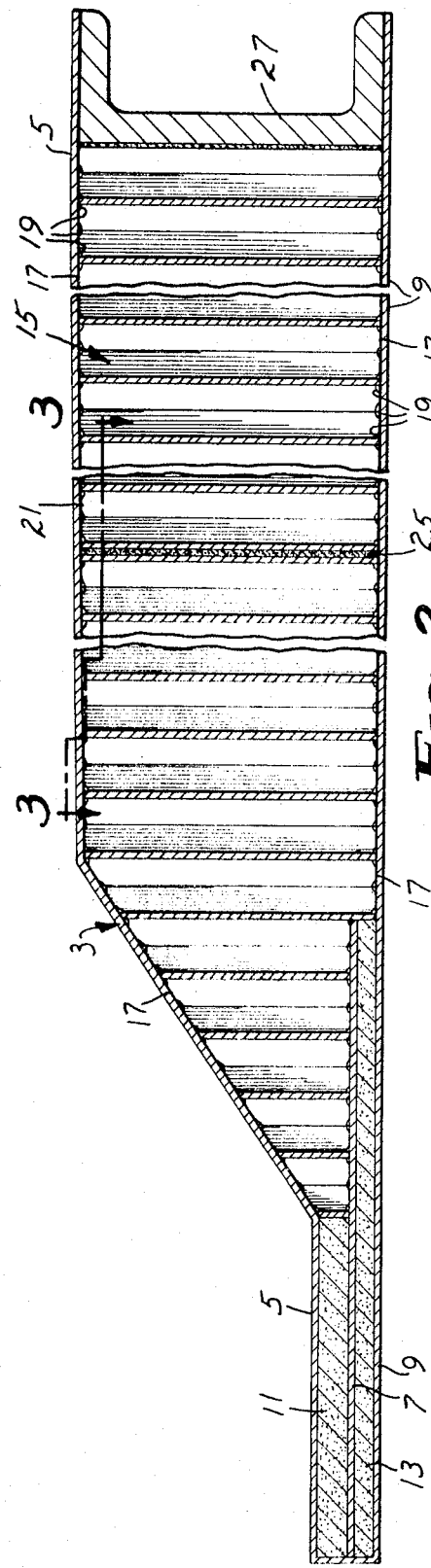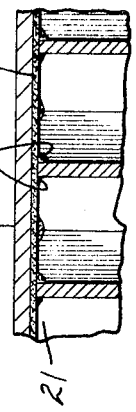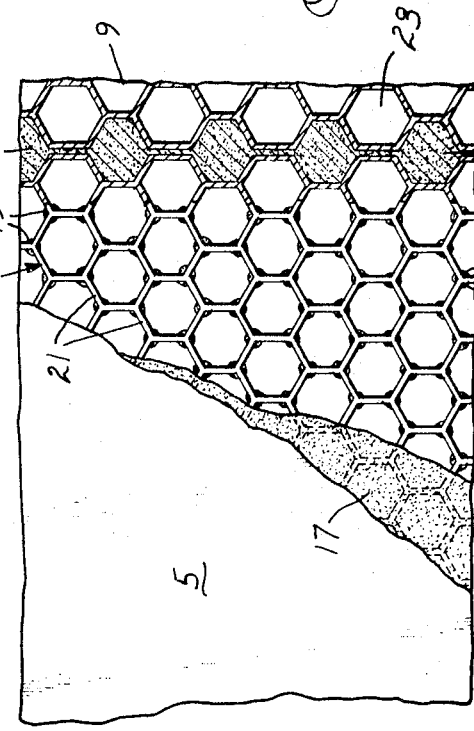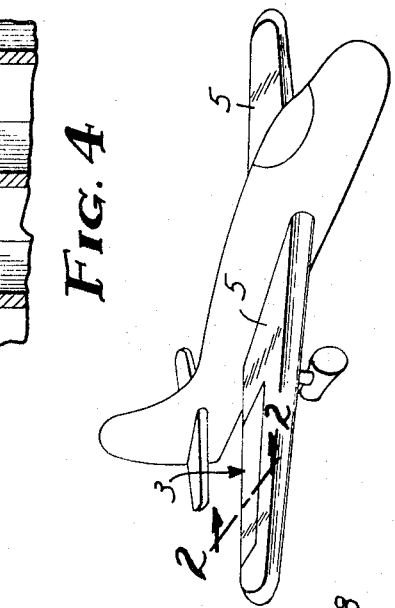
INVENTOR.
ALAN G. McKOWN
BY Kinney, Alexander,
Sell, Steldt & DeLa Hunt
ATTORNEYS 3,655,818
PARTICULATE ADHESIVE CONTAINING POLY-
EPOXIDES, CARBOXYLATED BUTADIENE-AC-
RYLONITRILE COPOLYMER, AND A UREA DE-
RIVATIVE AS A CURING AGENT
Alan G. McKown, St. Paul, Minn., assignor to Minnesota
 Mining and Manufacturing Company, St. Paul, Minn.
Filed Oct. 18, 1968, Ser. No. 768,675
Int. Cl. C08g 45/04
U.S. Cl. 260—837
14 Claims

A curable structural adhesive in flowable, particulate form comprising an epoxy resin modified with a nitrile rubber preferably containing free carboxyl groups, and an epoxy curing system which preferably will provide a cure at a temperature not exceeding about 250° F. Upon subjection to about 150° F., the adhesive converts to a state in which it will readily adhere to various substrates including metals. Also provided are a process for applying the adhesive as well as the substrates containing the adhesive both in the fused, non-cured state and the cured state.

---

This invention relates to structural adhesives; more particularly it relates to one part epoxy based structural adhesives in flowable, particulate form especially adapted for adhering metal sheeting to itself and to honeycomb cores such as are employed in aircraft wing assemblies.

From a historical viewpoint, bonding of an airframe is a recent development. The first production usage of a bonded structure was in World War II bombers. The upsurge of commercial aviation in the post-war period started the trend away from riveted assemblies towards a bonded assembly. The reasons involved were numerous but included cleaner air foil surfaces, improved fatigue strength, and a greater strength to weight ratio through the use of honeycomb construction.

Initially, bonding was confined to control surface area and empennage but as improvements in adhesives were made, the use of adhesives expanded until today it includes a large percentage of the aircraft including wings, rotor blades and fuselage.

The development of film adhesives was a prime factor for this increase in usage as it offered adhesives in 100% solids form and permitted application of a controlled amount of adhesive. Other adhesives available were solvent solutions where drying was a major difficulty or 100% solids pastes which at least prior to the advent of films did not possess the fine balance of properties required for a structural adhesive. However, even with films various hand lay-up operations are required in making a bonded assembly including removing a protective liner, positioning the film, removing a second protective liner, making cutouts in desired areas, and finally closing the bond. In addition to involving undue amounts of time, film adhesives suffered from other drawbacks including waste in material from cutting operations, difficulty in applying to contoured surfaces, inability to provide adjustments in thickness, and limitations in compensating for mismatch of parts.

Adhesives in paste form are even less desirable due in part to their tackiness at the time of application making precise positioning of the bonded elements difficult, difficulty in controlling the amount and location of the adhesive, and the further fact that solvents are required to remove the adhesive from unwanted areas. Liquid solvent containing structural adhesives also lacked suitability due to inability to localize application, the need for solvent removal with its attendant fire and toxicity hazards, and, as with the pastes, the tackiness of the adhesive at the time of application.

With the advent of the large jet aircraft the amount of bonded area per plane and the total number of planes anticipated will far outstrip the production facilities and work force available. It is not considered economically sound to merely increase floor space and hire more labor. For the above reasons, the presently available adhesives, both in terms of composition and form, do not lend themselves to the automated techniques which must be employed to meet this expanding demand.

To achieve a structural adhesive amenable to high production techniques and yet fulfill the stringent requirements of structural adhesives for aerospace environments is the primary object of this invention. These requirements are particularly formidable, calling for an adhesive which exhibits excellent strength properties over a wide temperature range which in turn depends on attainment of a delicate balance of such properties as adhesion, toughness, and tensile strength. The following table indicates the kind and value of properties over a wide temperature range desired in the bonds within such laminate structural members as are found in aircraft:

| Temperature of test, ° F. | −67 | 75 | 180 | 250 |
|---|---|---|---|---|
| Overlap shear [1] (minimum in pounds/square inch) | 3,500 | 3,500 | 2,000 | 750 |
| T-peel [2] (minimum in pounds/inch of width) | | 10 | 15 | 15 |
| Honeycomb peel [3] (minimum in inches of width) | | 10 | 10 | 10 |
| Beam-creep [4] (maximum in mils) | | | 50 | 50 |

[1] The free ends of strips of 1 inch wide, 4 inches long, 64 mil 2024 T3 clad aluminum alloy sheeting, bonded together at their other ends with 0.08 pound/square foot weight adhesive (used in all the tests) in a ½ inch overlapping joint, are pulled in opposite directions along their longitudinal axes.
[2] The adjacent ends of 1 inch wide, 8 inches long strips of 20 mil 2024 T3 clad aluminum alloy sheeting adhered together over most of their length are bent apart at right angles and are pulled in opposite directions.
[3] A free end of a 3 inches wide, 10 inches long, 20 mil 2024 T3 clad aluminum alloy sheeting is pulled from the ½ inch thick, ¼ inch cell honeycomb core of 4 mil 3003 aluminum alloy foil to which it is bonded by wrapping the sheeting around a 4-inch diameter roller riding on the surface of the sheeting.
[4] Three inches wide, 8 inches long laminates of the described honeycomb core with 64 mil skins of 2024 T3 clad aluminum alloy sheeting are supported by supports spaced 6 inches apart. A 1,000 pound weight at 75° F. and an 800 pound weight at 180° F. are loaded midway between the supports. After 192 hours the deformation of the center of the beam is measured.

The achievement of such properties when bonding to honeycomb requires an adhesive that not only exhibits strength properties in the cured state, but that also, when first heated, has flow and other characteristics necessary to wet and form a fillet along the contacted edge portion of the honeycomb. Moreover, the presence of aluminum as the substrate in the majority of aerospace structures to be bonded necessitates imposition of a limitation in the curing temperature of the adhesive in order to avoid reduction in corrosion and fatigue resistance of the aluminum. As a consequence, curing temperatures not exceeding about 250° F. are highly desirable and in some cases necessary.

The present invention provides a structural adhesive possessing the above stated properties as well as being amenable to automated techniques of application, such structural adhesive being a flowable particulate comprising at least one heat curable epoxy resin having on the average more than one 1,2 epoxy group per molecule, at least one copolymer of butadiene and acrylonitrile, and a curing system for said epoxy resin comprising at least one room temperature stable, nitrogen containing compound decomposable to form at least one amine having at least one active hydrogen atom.

Adhesives of the above composition and particulate form may be applied by various automatic means including rollers, electrostatic spray equipment, fluidized beds, and vibrating beds. In the completely uncured state, the adhesive is a flowable particulate which can be readily removed from undesired areas by means of a vacuum tool. Upon subjection to temperatures above about 120° F. and below the cure temperature, generally about 230–250° F., the adhesive enters an agglomerated, fused state in which it adheres strongly to the substrate to which it is applied and yet is not tacky or sticky enough to cause individually treated substrates to stick together during storage or shipment. Moreover, in this state, the treated parts can be manipulated into the bonding position without the need for careful precautions to insure precise initial matching. The adhesive can remain in this fused adherable, non-tacky, curable state for periods of up to about 45 days at temperatures less than about 90° F.

Because of this stability in an adherable state, it is now possible for the manufacturer of the basic structural elements, e.g. the manufacturer of panels and honeycomb structures, to pre-coat such elements with the adhesive, selectively remove adhesive from undesired areas, heat the adhesive to a fused, adhering state, and ship the resulting product to the ultimate fabricator such as the airplane manufacturer. Thus, the adhesive of this invention provides the opportunity for a form of marketing of structural units hitherto impossible with previous structural adhesives, giving the ultimate manufacturer the option of concentrating on the final assembling techniques to which it is best suited.

Epoxy resins suitable in the practice of this invention are thermosettable polyethers having on the average more than one 1,2 epoxy group per molecule, including the diglycidyl ethers of polyhydric phenols, glycidyl ethers of novolac resins, glycidyl ethers of aliphatic polyols, and glycidyl ethers containing nitrogen. Preferred diglycidyl ethers of polyhydric phenols include the condensation product of epichlorohydrin and Bisphenol A, especially those with an epoxy equivalent between about 550 and about 700 and a softening point between about 75° C. and 85° C. Exemplary commercially available Bisphenol A type epoxy resins are sold under the trade designations Epon 1002 (a solid diglycidyl ether of Bisphenol A, epoxy equiv. wt. 600–700) and DER 662 (a solid diglycidyl ether-Bisphenol-A resin, epoxy equiv. wt. 575–700). The glycidyl ethers of novolac resins are characterized by phenyl groups linked by methylene bridges with epoxy groups pendant to the phenyl groups, commercially available resins being sold under the trade designation DEN-438 (a polyglycidyl ether of phenolformaldehyde novolac, epoxy equiv. wt. 176–181) and ECN 1280 (a polyglycidyl ether of orthocresol-formaldehyde novolac, epoxy equiv. wt. 230). Commercially available glycidyl ethers of aliphatic polyols include those having the trade designations ERL–4201 (3,4-epoxy-6-methylcyclohexylmethyl 3,4-epoxy-6-methylcyclohexane carboxylate, epoxy equiv. wt. 145–156) and ERL–4289 (Bis(3,4-epoxy-6-methyl-cyclohexylmethyl)adipate, epoxy equiv. wt. 220). A commercially available glycidyl ether containing nitrogen is ERL 0510 (triglycidyl para-aminophenol, epoxy equiv. wt. 97–101).

The epoxy resin may be solid or liquid so long as the overall adhesive composition constitutes a grindable mass, at least in the presence of Dry Ice, which will provide a powdered adhesive at room temperature. Some agglomeration of adhesive may occur at room temperature but the adhesive should be capable of being broken up into matter having particulate character. It is preferred that at least some novolac epoxy resin be present to provide high temperature strength to the adhesive. Weight ratios of novolac epoxy to non-novolac epoxy resin of from 1:7 to 3:1 are suitable, with a major portion of novolac epoxy resin being preferred. If a liquid epoxy resin is employed, particularly a glycidyl ether of an aliphatic polyol or phenol, it should be combined with a major portion of solid epoxy resin, preferably at least as much as 70% by weight of the combined epoxy resin weight.

The nitrile rubbers—copolymers of butadiene and acrylonitrile—serve as modifiers for the epoxy resins. Preferably, the nitrile rubber contains a small percentage of carboxyl groups either terminally located or distributed throughout the polymer chain or both. Nitrile rubbers derived from 18–46% acrylonitrile, 55–82% butadiene, and 0–15% of a carboxylic acid represent typical formulations suitable in the practice of this invention. Commercially available nitrile rubbers include those sold under the trade designations Hycar 1072 (a carboxylated acrylonitrile/butadiene (AN/BD) copolymer having an acrylonitrile content of 30–35% by weight), Tylac 221A and Tylac 211A (a carboxylated butadiene/acrylonitrile rubbers having about 25% acrylonitrile and 5–10% carboxylic acid comonomer), Chemigum 550 (a carboxylated AN/BD copolymer), and Hycar 1042 (a non-carboxylated AN/BD copolymer having an acrylonitrile content of 32–34% by weight). The preference for carboxylated nitrile rubbers appears to be due to the reaction which occurs between the carboxyl groups and the epoxy groups which are activated during the curing or crosslinking reaction, thereby making the nitrile rubber an integral part of the cured system. While this integration is highly preferred, suitable adhesives have been provided without carboxylated nitrile rubbers.

The curing system for the epoxy resin includes at least one room temperature stable, nitrogen containing compound decomposable to provide at least one active hydrogen containing amine. Decomposition generally occurs at a temperature between 180° F. and 250° F. to provide curing in that temperature range generally within a period of one hour. For certain applications, especially for bonding aluminum substrates in aerospace structures, curing temperatures not exceeding 250° F. are desired. For other substrates, curing systems providing a cure at about 350° F. are suitable. Exemplary decomposable curing agents include mono- and poly-ureas, thioureas, and hydrazines, illustrative of which are the following:

3-phenyl-1,1-dimethyl urea;
3-p-chlorophenyl-1,1-dimethyl urea;
3-p-anisyl-1,1-dimethyl urea;
3-p-nitrophenyl-1,1-dimethyl urea;
3-phenyl-1,1-cyclopentamethylene urea;
3-phenyl-1,1-cyclohexamethylene urea;
N-(3,4-dichlorophenyl)-N',N'-dimethyl urea;
3-phenyl-1,1-dibutyl urea;
3-phenyl-1-benzyl-1-methyl urea;
trimethylurea;
3-phenyl-1,1-dimethylene urea;
3-cyclohexyl-1,1-dimethyl urea;
2,4-bis-(N,N-dimethyl carbamide) toluene;
N',N'-dimethyl-1,3-propane diamine dicarboxanilide;
1,3-dicyclohexyl urea;
1,3-dimethylol urea;
1,3-diethyl thiourea;
thiourea;
urea;
3-phenyl-1,1-dimethyl thiourea;
semicarbazide;
thiosemicarbazide;
4-phenyl-1,1-dimethyl semicarbazide;
4-phenyl-1,1-dimethyl thiosemicarbazide;
1-cyanoguanidine;
1,3-diphenyl guanidine; and
1,1'-(4-methyl-m-phenylene)-bis-[3,3'-dimethylurea].

Preferable among those listed are 3-phenyl-1,1-dimethyl urea, 3-p-chlorophenyl-1,1-dimethyl urea, and 3-p-nitrophenyl-1,1-dimethyl urea.

The active hydrogen containing amine decomposition product functions as a curing agent for the epoxy resin via an epoxy to epoxy crosslinking reaction. Whereas curing can be effectuated by the presence of such decomposition products alone, it has been found preferable to include certain curing agents such as dicyandiamide and isophthalyldihydrazide which alone provide epoxy curing at about 325° F. It has been found that such compounds in combination with the heat decomposable nitrogen containing compounds, such as 3-(p-chlorophenyl)-1,1-dimethyl urea and the like, provide a curative effect at temperatures as low as 190° F. For some reason not readily explainable the presence of these elevated temperature curing agents such as dicyandiamide and isophthalyldihydrazide contribute to the improvement of the physical properties of the cured system.

In addition to the room temperature stable, elevated temperature decomposable nitrogen containing compound, the curing system may contain (2) a hydroxyl containing organic compound and (3) an organo lead or mercury compound. Such a three-component curing system is disclosed in U.S. application Ser. No. 644,797 assigned to the common assignee. This curing system further reduces the cure temperature of the epoxy resin from about 250° F. to a temperature generally below 200° F.

The hydroxyl containing compound may be an aliphatic, alicyclic, or aromatic alcohol, carboxylic acid, hydroxy acid, or mixture thereof. Such compound may contain one or a plurality of hydroxy or carboxyl groups. Aliphatic polyhydroxy compounds are preferred, especially ethylene glycol and glycerol. Representative hydroxyl containing compounds are the following: ethylene glycol, glycerol, triethylene glycol, Bisphenol A, methanol, n-butanol, phenol, o-cresol, m-cresol, p-cresol, resorcinol, o-bromophenol, n-hexanol, trichloracetic acid, and mixtures thereof.

Exemplary organo-mercury and organo-lead compounds are phenyl mercuric hydroxide, phenyl mercuric acetate, phenyl mercuric stearate, lead octoate, lead linoleate, and lead acetate. The organo-mercury and organo-lead compounds, in combination with the nitrogen containing compound and the above described hydroxyl containing compounds, provide an unexpectedly rapid curing system for epoxy resins.

When employing the three component curing system, a major amount of the nitrogen-containing component and minor amounts of each of the other two components are generally employed. However, this could be reversed so that either of the hydroxyl containing or organo-metallic compound is in the majority. An excess of any of the three ingredients is not detrimental to the adhesive; it will merely serve as a filler. A suitable composition of the three component cure system is one containing about .025 to about 500, preferably about 1 to about 25, parts of nitrogen-containing compound per part of hydroxyl containing compound, and about .05 to about 5000, preferably about 1 to about 250, parts of nitrogen-containing compound per part of organo-metallic compound. Here, as elsewhere in the specification and claims, parts are by weight unless stated to the contrary.

In addition to the foregoing, the adhesive composition of this invention may include fillers and the like. Particularly desirable is a finely divided inorganic oxide such as titanium dioxide which has been found to promote sprayability in electrostatic equipment. Other suitable inorganic oxides are aluminum oxide ($Al_2O_3$) and calcium oxide ($CaO$). Another highly desirable component for inclusion in the adhesive of this invention is a corrosion inhibitive pigment such as a metal chromate (zinc, cadmium, calcium, strontium, lead, barium). By including a corrosion inhibitor directly into the adhesive, it has been found unnecessary to separately treat the metal surface to be bonded with a corrosion inhibitive primer.

The substrates to be bonded may be treated with adhesion promoting primers such as organosilanes to improve the bond strengths of the adhesive as is well known to the art.

The amount of the various components of the adhesive composition of this invention may vary over rather broad ranges. The nitrile rubber may suitably be present to the extent of from about 6 to about 54 parts by weight per 100 parts by weight of epoxy resin, with a range of 15-40 parts by weight being preferred. The novolac epoxy resin may be present to the extent of from about 10 to about 300 parts by weight per hundred parts by weight of non-novolac epoxy resin with from 30 to 100 parts per 100 parts of non-novolac epoxy resin being preferred. The curing system may suitably be present in an amount of at least .15, and preferably at least .8, amine hydrogen equivalents per epoxy equivalent. Higher levels of curing agents are not detrimental as they serve merely as fillers, albeit expensive ones. The metal oxide and the corrosion inhibitive pigment may each be present to the extent of from 0 to about 36 parts by weight per 100 parts by weight of epoxy resin.

Spraying, fluidized beds, and vibrating beds represent automated techniques for applying the adhesive of this invention to the substrate to be bonded. Because of the powdery nature of the adhesive, it can be readily removed by vacuum tools where desired. A preferred method comprises contacting a supply of powdered adhesive with a honeycomb core structure which is at a temperature sufficiently high to cause the adhesive to transfer to the core edges (about 150° F.) and yet insufficient to activate the elevated temperature decomposable curing agent, removing the adhesive coated core from the supply and, cooling the core structure such that the adhesive assumes a fused, non-tacky, adhering state.

The supply of powdered adhesive contacted by the heated core may suitably be in the form of a flat bed or coating on a roller. Adhesion of the powder to the roll surface can be maintained by electrostatic forces, vacuum forces, friction such as found in a pile type fabric, or the force of attraction which the roll surface inherently possesses with respect to the powdered adhesive.

A typical honeycomb assembly to be bonded by the adhesive of this invention is illustrated in FIGS. 1-4 wherein:

FIG. 1 illustrates an airplane in which structural members are bonded with the adhesive of this invention;

FIG. 2 is a cross-sectional view of the wing assembly taken along line 2—2;

FIG. 3 is a sectional view taken along line 3—3 of FIG. 2; and

FIG. 4 is an enlarged fragmentary view of the bonded area of the honeycomb core of FIG. 2.

Referring to FIGS. 1-4, section 1 of a wing assembly 3 is shown. The section 1 comprises a doubler portion consisting of aluminum panels 5, 7, and 9 bonded by adhesive layers 11 and 13. The honeycomb core 15 is bonded to the outer aluminum panels or skins 5 and 9 by means of an adhesive layer 17 and filleting adhesive 19 (see FIGS. 3 and 4). The adhesive layer 17 and filleting adhesive 19 may be of the same or different compositions falling within the scope of the present invention. Preferably, adhesive layer 17 contains a corrosion inhibitive pigment. As particularly shown in FIGS. 3 and 4, the filleting adhesive occurs substantially exclusively along the edges 21 of the honeycomb cells leaving the intra-cellular portion 23 open. Core sections are spliced together by means of an expandable adhesive 25 which may be in the form of a tape or other suitable form. The channel close-out portion 27 is also joined to the honeycomb core by means of an expandable adhesive 25.

To further illustrate the invention, the following non-limiting examples are provided in which all parts and percentages are by weight unless otherwise expressed.

EXAMPLE 1

| Material: | Parts by weight |
|---|---|
| Carboxylated nitrile rubber [1] | 321 |
| Epoxy resin [2] | 795 |
| Novolac epoxy [3] | 98 |
| $TiO_2$ | 80 |
| Dicyandiamide | 31.2 |
| 3-p-chlorophenyl 1,1-dimethyl urea | 20.1 |

[1] Trade designation—Hycar 1072.
[2] Trade designation—Epon 1002.
[3] Trade designation—ECN-1280.

The nitrile rubber is banded on a conventional rubber mill after which the epoxy resin and novolac resin, each in powder form, are added to the rubber on the mill and the mixture blended to a homogeneous mass. In successive order, the titanium dioxide, dicyandiamide, and 3-p-chlorophenyl 1,1-dimethyl urea are added. During addition of the latter ingredients, the rubber mill is cooled with circulating water to prevent heat buildup. After uniform mixing is obtained, the adhesive formulation is promptly removed from the mill and refrigerated at 0° F. to prevent any reactions from occurring. The adhesive is then ground with Dry Ice in a hammer mill to produce a particle size which will pass through a 60 mesh screen. The resulting powdered adhesive may be stored indefinitely at 75° F.

The powdered adhesive is then applied to at least one of the two elements to be bonded by one of the following methods:

(1) Electrostatic spraying.—Employing an electrostatic spray gun such as a Ransburg REP hand gun, the powdered adhesive is electrostatically charged while passing through the gun. The powdered, electrostatically charged adhesive issuing from the gun is applied to an electrically grounded metal sheet by electrostatic attraction. Excess adhesive is removed by brushing or suction using a vacuum tool. The adhesive is then fused to the metal surface by heating at 150° F. for 10 minutes in an air circulating oven. At this stage, the adhesive is firmly adhered to the surface in a non-tacky, uncured state. The parts to be bonded are then assembled and the adhesive cured by subjecting the assemblage to a temperature of 250° F. and a pressure of 50 p.s.i. for 60 minutes in an autoclave.

(2) Fluidized bed.—The metal substrate such as a honeycomb core is preheated to 150° F. and then dipped into a fluidized bed of the above adhesive. The adhesive fuses to the core edges, with the intra-cellular area being free of adhesive. The desired assemblage is completed and the adhesive cured as above.

(3) Powder bed.—The metal substrate is preheated to 150° F. and then brought into contact with a pile fabric surfaced roller bearing a layer of loosely adhering powder. The heat fuses the adhesive particles to the substrate. Assembling and curing are accomplished as above.

EXAMPLES 2–12

Adhesive compositions 1–11 are prepared in accordance with Example 1. Each adhesive is tested with the results shown in Table 2.

TABLE 1

| Sample | Epoxy resin [1] | | | Nitrile rubber | | Curing system | | | | Epoxy equiv. | Amine H equiv. |
|---|---|---|---|---|---|---|---|---|---|---|---|
| 1 | Epon 1002 | 89 | ECN 1280 | 11 | Hycar 1072 | 36 | Dicy [5] | 3.5 | P-CPDMU [2] | 2.25 | .191 | .178 |
| 2 | Epon 840 [7] | 34.9 | ____do____ | 65.1 | ____do____ | 26.5 | Dicy | 6.9 | P-CPDMU | 4.48 | .384 | .351 |
| 3 | Epon 836 [8] | 31.5 | ____do____ | 68.5 | ____do____ | 27.0 | Dicy | 7.32 | P-CPDMU | 4.72 | .398 | .373 |
| 4 | Epon 1002 | 73.2 | ____do____ | 26.8 | Hycar 1000×128 [11] | 27.1 | Dicy | 4.31 | P-CPDMU | 2.78 | .234 | .219 |
| 5 | ____do____ | 89 | ____do____ | 11 | Tylac 221A | 36 | Dicy | 3.5 | P-CPDMU | 2.25 | .191 | .178 |
| 6 | ____do____ | 73.1 | ____do____ | 26.9 | Hycar 1072 | 27 | Iphy [6] | 6.57 | P-CPDMU | 2.78 | .234 | .151 |
| 7 | ____do____ | 89 | ____do____ | 11 | ____do____ | 26.8 | Dicy | 4.45 | MMPD [3] | 1.94 | .191 | .227 |
| 8 | Epon 1004 [9] | 80.4 | ____do____ | 19.6 | Tylac 221A | 36 | Dicy | 3.16 | P-CPDMU | 2.03 | .169 | .160 |
| 9 | Epon 1002 | 77 | DEN 438 | 23 | Hycar 1072 | 36.2 | Dicy | 4.54 | P-CPDMU | 2.93 | .251 | .231 |
| 10 | ____do____ | 73.2 | ECN 1280 | 26.8 | ____do____ | 27 | Dicy | 3.28 | PDMU [4] | 5.46 | .234 | .189 |
| 11 | ____do____ | 89 | ERL 0510 [10] | 11 | ____do____ | 26.9 | Dicy | 4.44 | P-CPDMU | 2.86 | .240 | .225 |

[1] All parts are by weight.
[2] Para-chloro phenyl dimethylurea.
[3] 1,1'-(4-methyl meta phenylene) bis 3,3-dimethylurea.
[4] Phenyl dimethyl urea.
[5] Dicyandiamide.
[6] Isophthalyldihydrizide.
[7] Tradename for a solid diglycidyl ether-bisphenol A resin.
[8] Tradename for a viscous diglycidyl ether-bisphenol A resin.
[9] Tradename for a solid diglycidyl ether-bisphenol A resin.
[10] Tradename for a triglycidyl paraaminophenol resin.
[11] Tradename for non-carboxylated acrylonitrile 1 butadiene copolymer.

TABLE 2

| Sample | O.L.S.[8], ° F. | | | | T-peel [9], ° F. | | | | Honeycomb peel [10], ° F. | | |
|---|---|---|---|---|---|---|---|---|---|---|---|
| | −67 | 75 | 180 | 250 | −67 | 75 | 180 | 250 | −67 | 75 | 180 |
| 1 | 4,637 | 5,573 | 2,130 | 750 | 10 | 24 | 25 | 4.5 | 24 | 49 | 19 |
| 2 | 1,408 | 4,000 | 2,038 | 1,025 | 1 | 11 | 4 | 2.5 | 3.8 | 8.7 | 5.5 |
| 3 | 2,282 | 4,012 | 3,205 | 2,348 | 1.5 | 13.5 | 6 | 5 | 6.3 | 8.0 | 8.0 |
| 4 | 3,563 | 2,753 | 2,023 | 903 | 3.8 | 9.2 | 3 | 11 | 6 | 8 | 8 |
| 5 | 4,440 | 4,936 | 1,750 | 962 | 8.0 | 34 | 26 | 5 | 8.3 | 30.6 | 10.4 |
| 6 | 3,086 | 4,906 | 2,257 | 970 | 5.8 | 14.2 | 8 | 5 | 12.4 | 28.3 | 13.2 |
| 7 | 3,828 | 4,661 | 2,758 | 1,292 | 4.5 | 24.0 | 15.8 | 3.5 | 8.9 | 37.2 | 23.4 |
| 8 | 4,086 | 4,170 | 1,590 | 607 | 5.8 | 19.5 | 17.2 | 3.5 | 11.7 | 17.6 | 5.9 |
| 9 | 5,020 | 5,385 | 2,175 | 730 | 19.8 | 23.0 | 14.2 | 2.2 | 21.2 | 21.7 | 4.8 |
| 10 | 3,880 | 4,513 | 1,897 | 755 | 5.2 | 9.5 | 9.2 | 3.5 | 6.4 | 12.7 | 17.5 |
| 11 | 4,721 | 5,613 | 3,072 | 948 | 9.0 | 42 | 19.2 | 6.5 | 16.0 | 33.1 | 25.5 |

[8] Overlap sheer strength in pounds/in.$^2$.
[9] Metal to metal peel strength in pounds per inch width.
[10] Climbing drum sandwich in inch pounds per inch width.

While the present invention has been particularly described with respect to aluminum substrates employed in aerospace structures, it is to be understood that the adhesive of this invention finds application to a variety of other substrates such as wood, steel, plastics and the like.

What is claimed is:

1. A solid, flowable, particulate, curable adhesive com-
 (a) at least one curable epoxy resin having on the average more than one 1,2 epoxy group per molecule, (b) a copolymer derived from 18%–46% by weight acrylonitrile, 55%–82% by weight butadiene, and 0%–15% by weight of a carboxylic acid, said copolymer being present to the extent of from about 6 to about 54 parts by weight per 100 parts by weight of said epoxy resin, and (c) an epoxy curing system present in an amount of at least .15 amine hydrogen equivalents per epoxy equivalent comprising at least one room temperature stable urea compound decomposable below 250° F. to provide at least one active hydrogen-containing amine, wherein said adhesive, after a 1 hour cure at 250° F., exhibits an overlap shear value of at least 1500 p.s.i. in the range of −67° F. to 180° F.

2. The adhesive of claim 1 wherein said copolymer is derived from up to 15% by weight of a carboxylic acid.

3. The adhesive of claim 1 wherein said curing system comprises a mixture of 3-phenyl-1,1-dimethyl urea and dicyandiamide.

4. The adhesive of claim 1 wherein there are at least two epoxy resins, at least one of which is a condensation product of a polyhydric phenol and an epihalohydrin.

5. The adhesive of claim 1 wherein there are at least two epoxy resins, at least one of which is a condensation product of a polyhydric phenol and an epihalohydrin, and at least one of which is a novolac epoxy resin present to the extent of from about 10 to about 300 parts by weight per 100 parts by weight of said first recited epoxy resin.

6. The composition of claim 1 wherein said curing system comprises at least one room temperature stable urea compound decomposable below 250° F. to provide at least one active hydrogen-containing amine, and at least one compound selected from the class consisting of dicyandiamide and isophthalyldihydrazide.

7. The composition of claim 1 wherein said curing system comprises (1) at least one room temperature stable urea compound decomposable below 250° F. to provide at least one active hydrogen-containing amine, (2) a hydroxyl containing organic compound, and (3) an organo lead or organo mercury compound.

8. A solid, flowable, particulate, curable adhesive comprising
(a) at least two epoxy resins, at least one of which is a condensation product of a polyhydric phenol and an epihalohydrin, and at least one of which is a novolac epoxy resin present to the extent of from about 10 to about 300 parts by weight per 100 parts by weight of said first recited epoxy resin,
(b) a copolymer derived from 18%–46% by weight acrylonitrile, 55%–82% by weight butadiene, and up to 15% by weight of a carboxylic acid, said copolymer being present to the extent of from about 6 to about 54 parts by weight per 100 parts by weight of said epoxy resin, and
(c) an epoxy curing system present in an amount of at least 15 amine hydrogen equivalents per epoxy equivalent comprising at least one room temperature stable urea compound decomposable below 250° F. to provide at least one active hydrogen-containing amine, wherein said adhesive, after a 1 hour cure at 250° F., exhibits an overlap shear value of at least 1500 p.s.i. in the range of −67° F. to 180° F.

9. A solid, flowable, particulate, curable adhesive comprising
(a) at least one curable epoxy resin having on the average more than one 1,2 epoxy group per molecule,
(b) a copolymer derived from 18%–46% by weight acrylonitrile, 55%–82% by weight butadiene, and 0%–15% by weight of a carboxylic acid, said copolymer being present to the extent of from about 6 to about 54 parts by weight per 100 parts by weight of said epoxy resin,
(c) an epoxy curing system present in an amount of at least 15 amine hydrogen equivalents per epoxy equivalent comprising at least one room temperature stable urea compound decomposable below 250° F. to provide at least one active hydrogen-containing amine, and
(d) at least one metal compound selected from the class consisting of an inorganic metal oxide and inorganic metal chromate, wherein said adhesive, after a 1 hour cure at 250° F., exhibits an overlap shear value of at least 1500 p.s.i. in the range of −67° F. to 180° F.

10. An article comprising a substrate bearing a coating of the adhesive of claim 1.

11. An article comprising an aluminum substrate bearing a coating of the adhesive of claim 1.

12. An article comprising a honeycomb core substrate bearing a coating of the adhesive of claim 1.

13. An article comprising a substrate bearing a coating of the adhesive of claim 1 wherein there are at least two epoxy resins, at least one of which is a condensation product of a polyhydric phenol and an epihalohydrin.

14. An article comprising a substrate bearing a coating of the adhesive of claim 1 wherein there are at least two epoxy resins, at least one of which is a condensation product of a polyhydric phenol and an epihalohydrin, and at least one of which is a novolac epoxy resin present to the extent of from about 10 to about 300 parts by weight per 100 parts by weight of said first recited epoxy resin.

References Cited
UNITED STATES PATENTS

| | | | |
|---|---|---|---|
| 2,879,252 | 3/1959 | Been | 260—837 |
| 2,947,338 | 8/1960 | Reid | 260—836 |
| 3,100,160 | 8/1963 | Korpman | 260—837 |
| 3,208,980 | 9/1965 | Gruver | 260—836 |
| 3,219,515 | 11/1965 | Rice | 260—836 |
| 3,312,754 | 4/1967 | Marks | 260—837 |
| 3,324,198 | 6/1967 | Gruver | 260—837 |
| 2,713,569 | 7/1955 | Greenlee | 260—47 |
| 3,386,955 | 6/1968 | Nawakowski | 260—47 |

FOREIGN PATENTS

| | | | |
|---|---|---|---|
| 999,383 | 7/1965 | Great Britain | 260—836 |

PAUL LIEBERMAN, Primary Examiner

U.S. Cl. X.R.

260—2 EC, 2 N, 37 Ep, 41.5 R, 47 EC, 47 EN, 830 TW, 836; 117—17, 37 R, 132 BE, 132 CB, 138.8 A, 148, 68